United States Patent
Litwin et al.

(10) Patent No.: US 6,173,415 B1
(45) Date of Patent: Jan. 9, 2001

(54) SYSTEM FOR SCALABLE DISTRIBUTED DATA STRUCTURE HAVING SCALABLE AVAILABILITY

(75) Inventors: Witold Litwin, Boulogne (FR); Jaishankar Moothedath Menon, San Jose, CA (US); Tore Johan Martin Risch, Linkoping (SE)

(73) Assignee: International Business Machines Corporation, Armonk, NY (US)

( * ) Notice: Under 35 U.S.C. 154(b), the term of this patent shall be extended for 0 days.

(21) Appl. No.: 09/083,828

(22) Filed: May 22, 1998

(51) Int. Cl.$^7$ .................................................. G06F 11/10
(52) U.S. Cl. ..................... 714/7; 714/5; 714/6; 714/7; 714/701; 714/710; 714/711; 714/766; 714/769; 714/770; 711/114
(58) Field of Search ................................ 714/5, 6, 7, 701, 714/710, 711, 766, 769, 770; 711/114

(56) References Cited

U.S. PATENT DOCUMENTS

| | | | |
|---|---|---|---|
| 5,257,362 | * 10/1993 | Menon | 711/114 |
| 5,301,297 | 4/1994 | Menon et al. . | |
| 5,309,451 | 5/1994 | Noya et al. . | |
| 5,341,381 | 8/1994 | Fuller . | |
| 5,506,979 | * 4/1996 | Menon | 711/112 |
| 5,522,032 | 5/1996 | Franaszek et al. . | |
| 5,542,087 | * 7/1996 | Neimat | 707/10 |
| 5,564,116 | * 10/1996 | Arai | 714/7 |
| 5,634,033 | 5/1997 | Stewart et al. . | |
| 5,640,506 | 6/1997 | Duffy . | |
| 5,875,456 | * 2/1999 | Stallmo | 711/114 |
| 5,875,457 | * 2/1999 | Shalit | 711/114 |
| 5,960,169 | * 9/1999 | Styczinski | 714/6 |
| 6,000,010 | * 12/1999 | Legg | 711/114 |

OTHER PUBLICATIONS

"The HP AutoRAID hierarchical storage system" by J. Wilkes, R. Golding, C. Staelin and T. Sullivan, Hewlett–Packard Laboratories, Palo Alto, CA, SIGOPS '95 Dec. 1995 CO, USA.

"A Case for Redundant Arrays of Inexpensive Disks (RAID)", by D. A. Patterson, G. Gibson and R.H. Katz, Computer Science Division, Department of Electrical Engineering and Computer Sciences, University of California, Berkley.

"Algorithms for Software and Low–cost Hardware RAIDs", by J. Menon, J. Riegel and J. Wyllie, IBM Almaden Research Center, IEEE.

(List continued on next page.)

Primary Examiner—Robert W. Beausoliel, Jr.
Assistant Examiner—Bryce Bonzo
(74) Attorney, Agent, or Firm—Altera Law Group, LLC

(57) ABSTRACT

Disclosed is a system for generating parity information for a data file in a distributed data structure system. Data objects in the data file are distributed into data buckets located in memory areas in servers interconnected by a network. An nth set of bucket group numbers are generated. A data bucket and a parity bucket are associated with a bucket group number in the nth set. Parity data for the data objects is generated and stored in a parity bucket associated with a bucket group number in the nth set. After adding a data object to the data file an additional data bucket may be provided for additional data object storage space. After adding a data bucket, a determination is made as to whether bucket availability has decreased below a predetermined threshold. If so, an (n+1)th set of bucket group numbers is generated and parity data for at least one of the data objects is stored in a parity bucket associated with a bucket group number in the (n+1)th set. A bucket group number in the (n+1)th set is associated with a data bucket and a parity bucket.

31 Claims, 9 Drawing Sheets

OTHER PUBLICATIONS

"The Logical Disk: A New Approach to Improving File Systems", by W. de Jonge, Dept. of Mathematics and Computer Science, Vrije Universiteit, Amsterdam, and M.F. Kaashoek and W. C. Hsieh, Laboratory for Computer Science, MIT, Cambridge MA, SIGOPS '93/Dec. 1993/N.C., USA, ACM.

"The Design of Large–Scale, Do–It–Yourself RAIDS", by S. Asami, N. Talagala, T. Anderson, K. Lutz and D. Patterson, Computer Science Division, University of California, Berkley, Nov. 10, 1995.

"SP2 system architecture", by T. Agerwala, J.L. Martin, J.H. Mirza, D.C. Sadler, D.M. Dias and M. Snir, IBM Systems Journal, vol. 34, No. 2, 1995.

"DB2 Parallel Edition", by C.K. Baru, G. Fecteau, A. Goyal, H. Hsiao, A. Jhingran, S. Padmanabhan, G.P. Copeland and W.G. Wilson, IBM Systems Journal, vol. 34, No. 2, 1995.

"Research Report Swift/Raid: A Distributed Raid System", by B.R. Montague, D. D. E. Long and L.F. Cabrera, IBM Research Division, Almaden Research Center, 1993.

"LH*–A Scalable, Distributed Data Structure", by W. Litwin, M.A. Neimat and D.A. Schneider, Hewlett–Packard Labs, Palo Alto, CA, ACM Transactions on Database Systems, vol. 21, No. 4, Dec. 1996, pp. 480–525.

* cited by examiner

| r | c | non-key data |
|---|---|---|
| 22 | 24 | 26 |

Fig. 2

| C1 | C2 | ... | Ck | Parity Bits |
|---|---|---|---|---|

Fig. 4

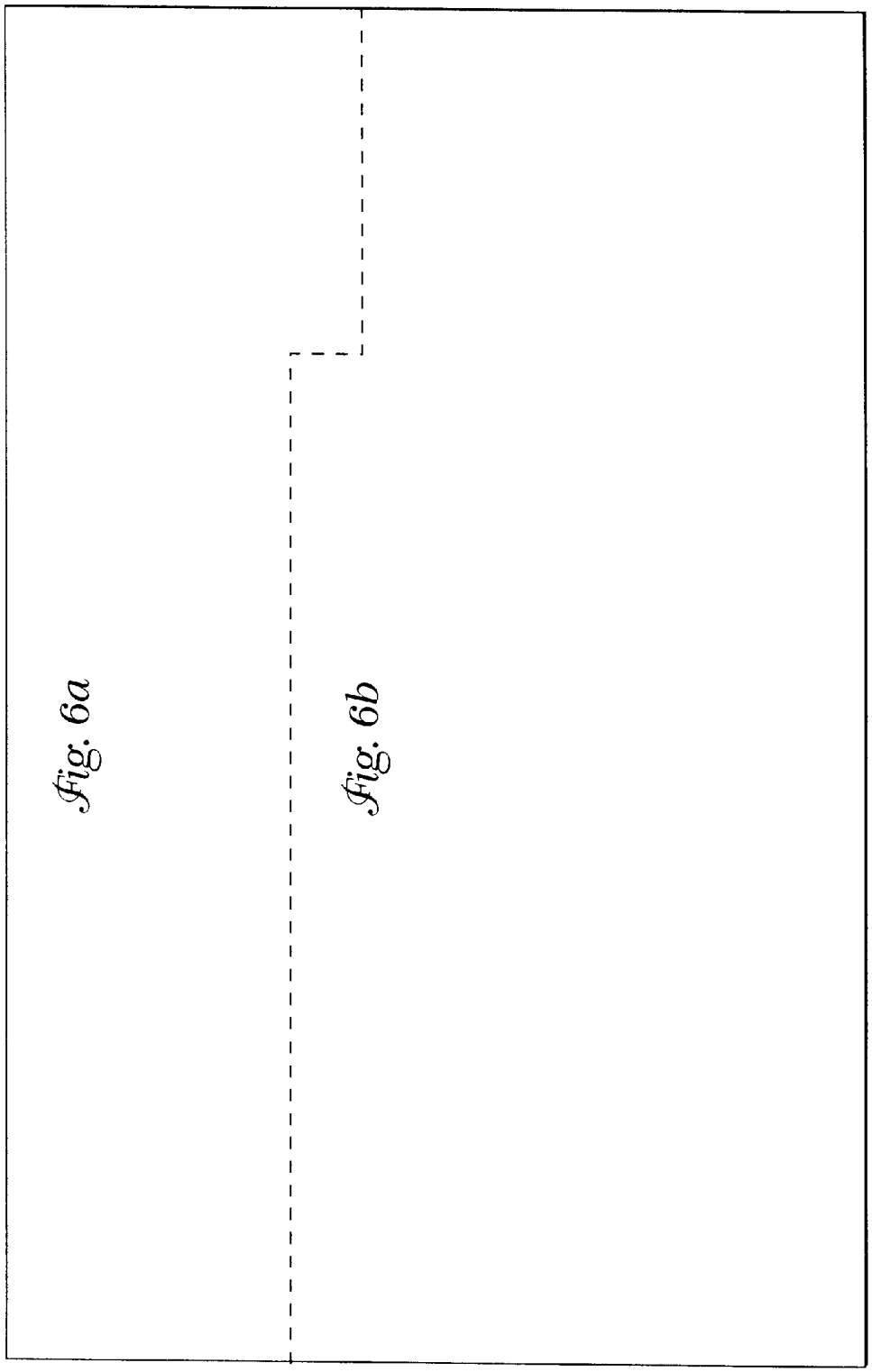

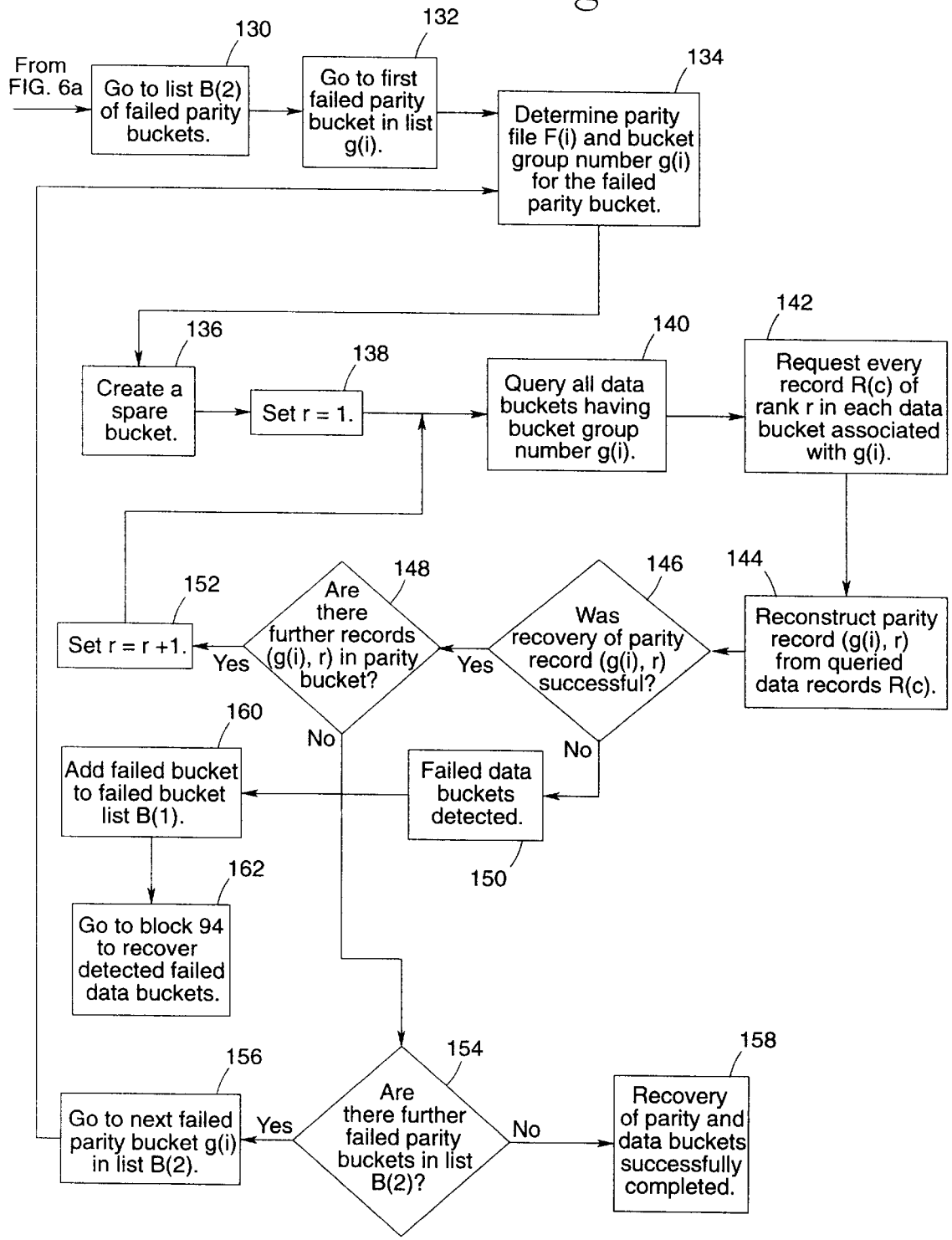

SYSTEM FOR SCALABLE DISTRIBUTED DATA STRUCTURE HAVING SCALABLE AVAILABILITY

CROSS-REFERENCE TO RELATED APPLICATION

This application is related to the co-pending and commonly-assigned application Ser. No. 09/083,599, filed on same date herewith, by Witold Litwin, Jai Menon, and Tore Johan Martin Risch, entitled "Method And System For Data Recovery Using A Distributed And Scalable Data Structure," which application is incorporated herein by reference in its entirety.

BACKGROUND OF THE INVENTION

1. Field of the Invention

The present invention relates to a system for generating parity files in a distributed data structure and, in particular for providing a highly scalable and highly available data structure.

2. Description of the Related Art

The trend in data and file storage is to use distributed data structure systems. In network systems including client and server machines, files may be distributed over many machines in the system. In this way, a pool of computer sites attached to the network provides added power and resources. One recent development is to use the RAM in computers throughout the network system instead of local hard disk drive space. A network system comprised of numerous sites (processors) having megabytes (MB) of RAM per site can provide a distributed RAM space capable of storing files having a size in gigabytes (GB). In network systems, client and server machines function as nodes of a network. Each server (or client) provides storage space within its local RAM or local hard disk drive space to store objects comprising a file. The storage space each machine provides for this network file is called a "bucket." The number of interconnected servers in a system can extend from 10 to 100,000. The file consists of records, i.e., objects, that are identified by primary keys (c). A record R with a key is denoted as R(c), whereas c refers to the key value.

One problem with such distributed data structure systems is how to determine the optimal number of sites to utilize to store the distributed file. The use of too many sites may deteriorate system performance. Moreover, the optimal number of sites is often unknown in advance or can change as the file size changes. The goals of a distributed data structure include: (1) providing flexibility such that new servers can be added to the distributed system as a file expands; (2) no centralized site that must process and manage all computations; (3) no need to provide updates to multiple nodes in the system to primitive commands, e.g., search, insertion, split, etc. A distributed system that satisfies the above three constraints is known as a Scalable Distributed Data Structure (SDDS).

On such prior art SDDS is the Linear Hashing system, also known as LH*, described in detail in "LH*—A Scalable, Distributed Data Structure," by Witold Litwin, Marie-Anne Neimat, and Donovan A. Schneider, published in ACM Transactions on Database Systems, Vol. 21, No. 4, December 1996, pgs. 480–525, which is incorporated herein by reference in its entirety. An LH* file is stored across multiple buckets comprising local disk drive space or RAM. The LH* is a hashing function that assigns a bucket address to a key c added to the file by applying the hashing function to the key c value.

Each bucket has a predetermined record limit b. When a bucket reaches such predetermined maximum size, a bucket is added to the system and the contents of the full bucket are split into this new bucket. Every split moves about half of the records in a bucket to a new bucket at a new server (site). The bucket to be split is denoted by a pointer referred to as n, the split pointer. Buckets are split sequentially, where the split pointer maintains the last bucket split. The file level q is the file level value that indicates the number of splitting sequences that have occurred. The file level q is used to determine the number of buckets, $2q-1$, at any given level. For instance, when there is only 1 bucket, q=0. When a new bucket is created, q increments by one, which in the present case increments to q=1. The pointer n is then set back to bucket 0. Bucket 0 is split, then bucket 1 is split. When bucket number $2q-1$ bucket is split, which in this case is bucket 1, there are then four total buckets (0, 1, 2, 3) and q is incremented to two. This process of cycling through the current number of buckets to split buckets is described in "LH*—A Scalable, Distributed Data Structure," by Witold Litwin et al., incorporated by reference above.

When a bucket overflows, the client or server maintaining the bucket reports the overflow to a dedicated node called a coordinator. The coordinator applies a bucket load control policy to determine whether a split should occur.

When a record c is added to the file F, a directoryless pair of hashing functions $h_q$ and $h_{q+1}$, wherein q=0, 1, 2, are applied to the record c to determine the bucket address where the record c will be maintained. The function $h_q$ hashes a key (c) for the data record, which is typically the primary key. The value of the split pointer n is used to determine which hashing function, $h_q$ or $h_{q+1}$ should be applied to the key c to compute a bucket address for the record c. If the coordinator determines that a split should occur, the coordinator signals a client in the system to perform the split calculations. The client uses the hash functions to hash a key c into a bucket address.

Traditional LH approaches assume that all address computations use correct values for q and n. This assumption cannot be satisfied if multiple clients are used unless a master site updates all clients with the correct values for q and n. LH* algorithms do not require that all clients have a consistent view of q and n. In LH*, each client has its own view of q and n, q' and n'. These values are only updated after a client performs an operation. Because each client has a different view of q and n, each client could calculate a different address for a record c. In LH*, the client forwards the record c to the server based on the result of the hashing function and the values of q' and n' maintained by the client.

The server, where the bucket resides, that receives the record c from the client applies the hashing functions using the values of q' and n' at the server to determine if the bucket address for the key c is the address of the target server. If the client sent the key c to the correct bucket, the key c is stored in the bucket. If not, the server calculates the new address and forwards the key c to the correct server (bucket). The recipient of the key checks the address again, and may resend the key c to another bucket if the initial target server (bucket) calculated the wrong address using its values n' and q'. Under current LH* algorithms, records are forwarded to a correct new bucket address in at most two forwardings. When the correct server gets the records for the new bucket, the correct server sends an image adjustment message (IAM) to the client, and any intermediary servers using incorrect values of n and q, to allow the client (or server) to adjust its values of n' and q' closer to the correct image of q and n.

Such LH* schemes typically guarantee that all data remain available, i.e., recoverable, as long as no more than s sites (buckets) fail. The value of s is a parameter chosen at file creation. Such s availability schemes suffice for static files. However, one problem with such prior art static schemes is that such schemes do not work sufficiently for dynamic files where the size of the file is scalable. For instance, at given value of s, i.e., the system remains available if no more than s buckets fail, as the file increases in size, the file reliability, i.e., probability that no data is lost, decreases.

SUMMARY OF THE INVENTION

To overcome the limitations in the prior art described above, preferred embodiments of the present invention disclose a system for generating parity information for a data file. Data objects in the data file are distributed into data buckets located in storage areas in servers interconnected by a network. An nth set of bucket group numbers is generated. A data bucket and a parity bucket are associated with a bucket group number in the nth set. Parity data for the data objects is generated and stored in a parity bucket associated with a bucket group number in the nth set. After adding a data object to the data file an additional data bucket may be provided for additional data object storage space. After adding a data bucket, a determination is made as to whether bucket availability has decreased below a predetermined threshold. If so, an (n+1)th set of bucket group numbers is generated and parity data for at least one of the data objects is stored in a parity bucket associated with a bucket group number in the (n+1)th set. A bucket group number in the (n+1)th set is associated with a data bucket and a parity bucket.

In further embodiments, prior to generating the (n+1)th set of bucket group numbers, parity data for data objects in k data buckets are maintained in a parity bucket associated with a bucket group number in the nth set. In such case, k is reduced to a lower value k'. Parity data for data objects in k' data buckets is stored in at least one parity bucket associated with a bucket group number in the nth set and parity data for data objects in k–k' data buckets is stored in at least one parity bucket associated with a bucket group number in the (n+1)th set. Data buckets associated with bucket group numbers in the nth set are not associated with bucket group numbers in the (n+1)th set.

In still further embodiments, the parity data generated and stored in parity buckets associated with bucket group numbers in the nth set comprises first parity data. In such case, the step of generating the (n+1)th set of bucket group numbers further includes the step of generating second parity data for the data objects. The step of storing the parity data includes storing the nth parity data in at least one parity bucket associated with bucket group numbers in the nth set and storing the (n+1)th parity data in at least one parity bucket associated with a bucket group number in the (n+1)th set.

In still further embodiments, data buckets are assigned bucket group numbers in the nth and (n+1)th sets of bucket group numbers such that for a first data bucket and a second data bucket, if the first data bucket and second data bucket are associated with the same bucket group number in the nth set of bucket group numbers, then the first data bucket and second data bucket are associated with different bucket group numbers in the (n+1)th set of bucket group numbers.

In yet further embodiments, the data objects in a data bucket are assigned a rank value. For a given rank value and bucket group number, a parity record includes parity data for every data object having the given rank value in each data bucket associated with the given bucket group number. The parity records are stored in a parity bucket having the same bucket group number as the given bucket group number of the data bucket.

With the above embodiments, a number of parity buckets are provided to insure that a file of data objects remains highly available even as the size of the file changes. High-availability means that the file remains available even if some of its records or buckets are unavailable.

BRIEF DESCRIPTION OF THE DRAWINGS

Referring now to the drawings in which like reference numbers represent corresponding parts throughout:

FIG. 2 illustrates the data structure of a data record in accordance with preferred embodiments of the present invention;

FIG. 4 illustrates the data structure of a parity record in accordance with preferred embodiments of the present invention;

FIGS. 7a and 7b are flowcharts illustrating preferred logic for recovering failed data and parity buckets in accordance with preferred embodiments of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
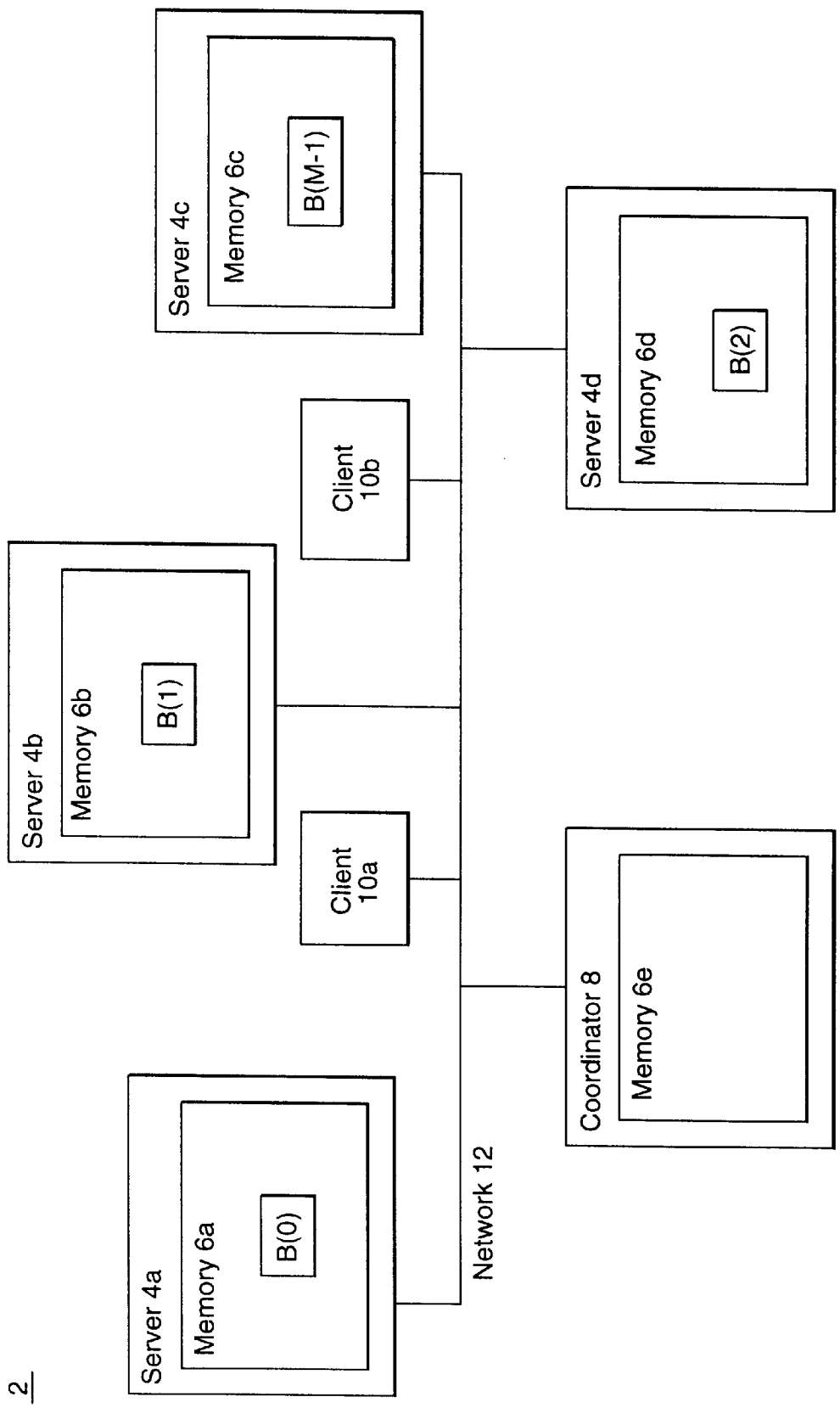
FIG. 1 is a block diagram illustrating a software and hardware environment in which preferred embodiments of the present invention are implemented.

FIG. 1 illustrates a network system 2 comprised of servers 4a, b, c, d. Each server includes a memory 6a, b, c, d. Each memory 6a, b, c, d includes a memory area dedicated to one or more buckets $B_0$, $B_1$, $B_2$, . . . $B_{M-1}$. Buckets (B) are numbers 0, 1, 2, . . . M-1, where M denotes the current number of buckets. A file is stored throughout the buckets $B_0$ through $B_{M-1}$. Each server 4a, b, c, d is comprised of a computer, such as a personal computer, workstation, mainframe, etc. Each memory 6a, b, c, d is comprised of a random access memory (RAM) controlled by the computer 6a, b, c, d or a local non-volatile storage area, such as a hard disk drive.

A plurality of client computers 10a, b are capable of accessing records in a file stored across the buckets $B_0$ through $B_{M-1}$. The client computers 10a, b may be a personal computer, laptop, workstation, mainframe, etc. A coordinator computer 8, including memory 6e, provides file management services for files stored throughout the buckets $B_0$ through $B_{M-1}$. The client computers 10a, b may search, insert or delete records in the data file. The coordinator computer 8 memory 6e, which may be local RAM or hard disk storage space, may also contain a data bucket $B_i$ and data records.

A network system 12 provides communication among the servers 4a, b, c, d, the coordinator 8, and the clients 10a, b. The network 12 may be comprised of any suitable network architecture known in the art, such as LAN, Ethernet, WAN, SNA networks, a System Area Network (SAN), such as the ServerNet network offered by Compaq Computer Corporation, Token Ring, LocalTalk, TCP/IP, the Internet, etc. The network may further allow the clients 10a, b or any other connected system to communicate via a remote or wireless connection. In further embodiments, the servers 4a, b, c, d and 8 may be linked via a high speed communication SAN and the clients 10a, b may be linked to one or more of the servers 4a, b, c, d and 8 via another network communication system, such as a LAN or Ethernet.

In yet further embodiments, the functions described herein as being performed by the coordinator 8 may be distributed throughout the coordinator 8 and servers 4a, b, c, d if the coordinator 8 and servers 4a, b, c, d include parallel processing software, such as the ORACLE® Parallel Server, described in Oracle publication "ORACLE 7 Parallel Server Concepts and Administration, Release 7.3," part No. A4252201 (Oracle copyright, 1996), which publication is incorporated herein by reference in its entirety. ORACLE is a registered trademark of Oracle Corporation. Moreover, if the coordinator 8 fails, the functions of the coordinator 8 can be assumed by the surviving servers 4a, b, c, d.

Bucket Groups

Each file consists of a plurality of records (R). Each record includes a primary key (c). A primary key is a key that holds a unique value for the record (R). A record (R) with key (c) is denoted as R(c). A data object refers to any whole or part of a data record, including the keys or non-key data. The records of the file are stored in buckets $B_0$ through $B_{M-1}$, wherein each bucket (B) has a capacity of b records, where b>>1. In preferred embodiments, a file maintains one bucket on each server 4a, b, c, d. Each server 4a, b, c, d and client 10, a, b maintain a file allocation table that provides the network address for each bucket, including the server that holds a particular bucket.

FIG. 2 provides an illustration of the structure of a data record R(c) 20. Every data bucket m has an insert counter $(r_m)$ 22. This counter r 22 is an integer value representing the order in which the record R(c) was added to the bucket, i.e., the rank of each record R(c) in the bucket. The record 20 further includes a primary key (c) 24 portion and non-key data 26. Thus, the first record R(c) has an insert counter (r) 22 of 1, the second R(c) added to the bucket has an insert counter (r) 22 of 2, etc.

Each file (F) is a collection of files $F_i$, where i=0, 1, 2, ... I. The files $F_i$ are stored on buckets distributed throughout the network 12. The file $F_0$ includes the data records R(c). The files $F_i$ for i>0 are parity files. Each parity file $F_i$, for i≧1, is comprised of a plurality of buckets. Each file consists of at least $F_0$, $F_1$. When the coordinator 8 adds buckets to handle additional records R(c) added to a file, parity files $F_i$ may be added. Included in the coordinator 8 and/or other servers 4a, b, c, d throughout the network 12 is a computer program that implements a family of grouping functions, $f_i$, where i=0, 1, 2, that assigns bucket group numbers $g_i$ to data buckets in $F_0$. A bucket group number $g_i$ is the bucket in parity file $F_i$ in which parity data is maintained for the data bucket in $F_0$ assigned the bucket group number $g_i$. For instance, if parity file $F_2$ has two buckets, 0 and 1, and a data bucket in $F_0$ is assigned the bucket group number $g_2$=1, then the parity data for such data bucket is maintained in the second bucket in parity file $F_2$.

In preferred embodiments, bucket group numbers are generated in accordance with the following Bucket Grouping Proposition:

bucket group numbers $g_i$ are assigned to buckets, such that for every bucket address $m_1$, $m_2$, and i, if $m_1$ and $m_2$ belong to the same bucket group $g_i$ generated by $f_i$, where i=1 ... ; then for every $f_j$; j≠i; $m_1$ and $m_2$ belong to different bucket groups.

A bucket group consists of all buckets sharing a bucket group number $g_i$ assigned according to the grouping functions $f_i$ that adhere to the Bucket Grouping Proposition. The grouping functions, $f_i$, are selected such that every bucket group can have no more than k buckets. When the data file $F_0$ scales up to a bucket number based on some function of k, the next grouping function $g_{i+1}$ is used to assign bucket group numbers $g_{i+1}$ to the current set of buckets according to the Bucket Grouping Proposition. The new parity file $F_{i+1}$ then stores parity data according to this new assignment of the bucket group numbers $g_i$ to the current data buckets. For instance, in preferred embodiments, after the kth data bucket is added by splitting, the second grouping function $f_2$ is used to assign bucket group numbers $g_2$ to the current set of k data buckets. Thus, the parity buckets in parity file $F_2$ store additional parity data for the data file based on how the grouping function $f_2$ assigns bucket group numbers $g_2$ to the data buckets in $F_0$. When the data buckets scale up to $k^2$, then grouping function $f_3$ is used to assign bucket group numbers $g_3$ to the current number of $k^2$ buckets. When the buckets scale up to $k^3$ buckets, then parity file $F_4$ is added and grouping function $f_4$ is used to assign bucket group numbers $g_4$ to the current set of $k^3$ buckets. Each addition of a parity file $F_i$ and assignment of bucket group numbers $g_i$ by an additional grouping function $f_i$ increases the number of bucket group numbers each data bucket participates in. Thus, if i=2, then each data bucket in $F_0$ participates in two parity bucket groups and has parity data maintained in two separate parity files. This increases the availability of the data in the bucket in case of failure; otherwise referred to as file availability.

Each value $g_i$ is calculated according to equations (1) from its data bucket address m and the maximum number of buckets per bucket group k.

$$g_1 = \text{int}(m/k) \quad (1)$$

$$g_2 = \text{mod}(m/k) + \text{int}(m/k^2)$$

$$g_3 = \text{mod}(m/k^2) + \text{int}(m/k^3)$$

$$\cdots$$

$$g_i = \text{mod}(m/k^{i-1}) + \text{int}(m/k^i)$$

The grouping functions $f_i$ used to generate bucket group numbers $g_i$ according to equation (1) are expressed in equations (2):

$$f_1 : (m, m+1, m+2 \ldots m+(k-1)) \qquad \text{for } m = 0, k \ldots \qquad (2)$$

$$f_2 : (m, m+k, m+2k \ldots m+(k-1)k) \qquad \text{for } m = 0, 1, 2 \ldots k-1, k^2,$$
$$k^2 + 1 \ldots k^2 + (k-1), 2*k^2 \ldots$$

$$f_3 : (m, m+k^2, m+2k^2 \ldots m+(k-1)k^2) \qquad \text{for } m = 0, 1 \ldots k^2 - 1, k^3, k^3 + 1 \ldots$$
$$k^3 + (k^2 - 1), 2k^3 \ldots 2k^3 + (k^2 - 1)$$

$$\ldots$$

$$f_i : (m, m+k^{i-1}, m+2k^{i-1} \ldots m+(k-1)k^{i-1}) \quad \text{for } m = 0, 1 \ldots k^{i-1} - 1, k^i \ldots$$
$$k^i + k^{i-1} - 1, 2k^i \ldots$$

For example, if $k=4$, then the above set of grouping function $f_i$ equations (2) when $k=4$, would assign bucket group numbers $g_i$ to bucket addresses m as follows:

$f_1 : 0 = (0, 1, 2, 3); 1 = (4, 5, 6, 7) \ldots 2$ $f_2 : 0 = (0, 4, 8, 12); 1 = (1, 5, 9, 13) \ldots 3 = (3, 7, 11, 15),$ $4 = (16, 20, 24, 28) \ldots 7 = (19, 23, 27, 31), 8 = (32, 36 \ldots 44) \ldots$ $f_3 : 0 = (0, 16, 32, 48), 1 = (1, 17, 33, 49) \ldots 15 = (15, 31, 47, 63),$ $16 = (64, 80, 96, 112) \ldots$ The bucket group numbers generated by the grouping functions $f_i$ are on the left hand side of the equals sign and the data bucket addresses assigned to that bucket group number are on the right hand side of the equals sign. Thus, the parity data for the data buckets on the right hand side of the equation is maintained in bucket g of file $F_i$. For instance, grouping function $f_1$ assigns bucket group number 1 to data buckets 4, 5, 6, 7; grouping function $f_2$ assigns bucket group number 0 to data buckets 0, 4, 8, 12. This means that parity data for data bucket 4 is maintained in bucket 1 of parity file $F_1$ and bucket 0 of parity file $F_2$.

Figure 3:
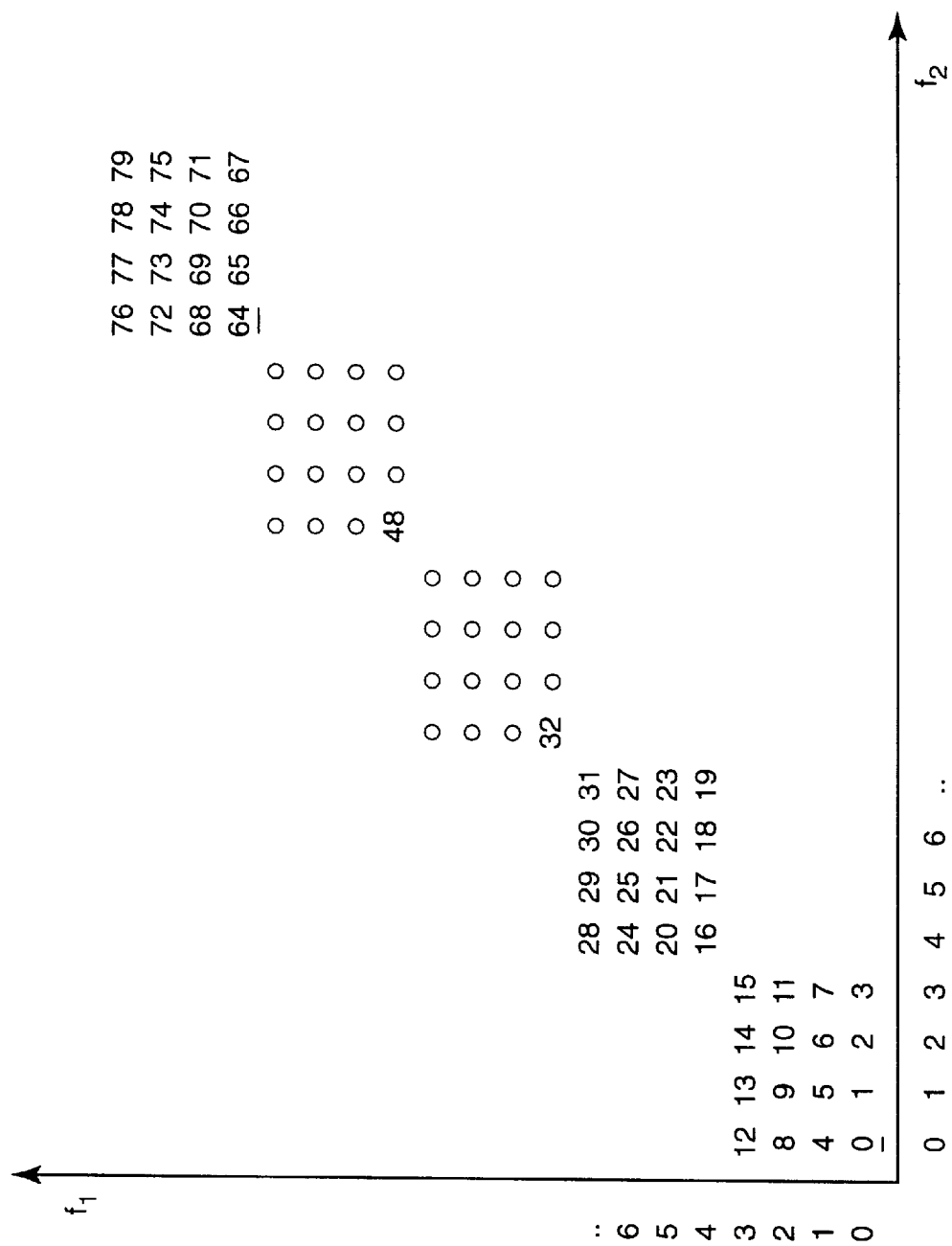
FIG. 3 is a an illustration of an (X,Y) graph illustrating how data buckets are assigned to bucket group numbers in accordance with preferred embodiments of the present invention.

FIG. 3 illustrates a two dimensional graph showing how the grouping functions $f_i$ assign bucket group numbers when $k=4$. The points at each (x, y) coordinate are data bucket addresses in $F_I$. The numbers 0, 1, 2, 3 along the vertical axis are bucket group numbers $g_1$ assigned by grouping function $f_1$ to the bucket addresses extending horizontally from each point (g) on the vertical axis. Thus, grouping functional assigns group number $g_1=0$ to bucket addresses 0, 1, 2, 3; group number $g_1=1$ to bucket addresses 4, 5, 6, 7, etc. The numbers along the horizontal axis are bucket group numbers $g_2$ assigned by grouping function $f_2$ to the data bucket addresses extending vertically from each point on the horizontal axis. Thus, grouping function $f_2$ assigns bucket group number $g_2=0$ to bucket addresses 0, 4, 8, 12; bucket group number $g_2=1$ to bucket addresses 1, 5, 9, 13, etc.

Record Groups

Each record R(c) in a data bucket is assigned a record group number expressed by the couple $(g_i, r)$. "r" is the insert number, indicating the rank order in which the record R(c) is inserted in the data bucket storing the record, and i is the grouping function number that assigned the group number $g_i$. In preferred embodiments, a parity group size is at most k. A parity record $(g_i, r)$ is a set of all records R(c) sharing the same parity record number $(g_i, r)$. A parity record $(g_i, r)$ is stored in the $g_i^{th}$ bucket of parity file $F_i$ at insert rank r within such parity bucket.

FIG. 4 illustrates the file structure of a parity record $(g_i, r)$ 30. The parity record 30 has a plurality of keys c from the data records R(c) in the data buckets. Each parity record 30 has no more than k keys c and parity bits over non-key data to provide error correction in a manner known in the art. The insert counter rank (r) may extend from one until the maximum number of records in a bucket b. Thus, each bucket $g_i$ in the parity file $F_i$ includes r records, comprised of parity records $(g_i, 1), (g_i, 2) \ldots (g_i, b)$, where b is the maximum number of records in a bucket.

Parity records $(g_i, r)$ need additional storage. There is one parity record $(g_i, r)$ per k data records c. Thus, a file with J parity files $F_i$, for $i=1 \ldots J$, requires J/k additional storage buckets. As the number of data buckets in the data file $F_0$ increases, so does the need for buckets to add parity records $(g_i, r)$.

The preferred embodiment algorithms used to assign bucket and record group numbers to data records and parity files for such records may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a holographic unit, a file server providing access to the programs via a network transmission line, etc. Of course, those skilled in the art will recognize many modifications may be made to this configuration without departing from the scope of the present invention.

Measurements of Availability and Alternative Algorithms to Improve Availability

A measure of the availability of the data file as the number of buckets increases is referred to as reliability. Reliability is the probability P that the entire file $F_0$ is available. Higher reliability means lower probability of unavailability, i.e., of an unavailability of m>I buckets. Typically, P is expected to remain above a threshold T, e.g., T=0.9. Otherwise, a new parity file, i.e., bucket group numbers, will be generated to improve reliability. The probability P decreases when the number of data buckets in the file $F_0$ grows, i.e., when the file scales up. Thus, the reliability of an s available file decreases as the file scales-up.

In preferred embodiments, a file having I availability remains available, i.e., failed buckets may be recovered, as long as in every bucket group $g_i$ there are no more than I unavailable buckets. The availability $P_I$ for an I available file, wherein p is the probability that a bucket fails, is:

$$P_I = \left( (1-p)^{k+1} + \sum_{i=1}^{n} C_i^{k+1} * p^i (1-p)^{k+1-i} \right)^{[M/k]}$$

For every I, $P_I$ converges towards 0 when I increases. Also, that $P_I$ increases with I, for any given M. In preferred embodiments, a new grouping level I=:I+1 and new parity file $F_{I>1}$ is added when bucket $M=k^{I-1}$ is added to accommodate new buckets. From that point every split adds parity records of $F_I$. These not yet split only have the $f_{I-1}$ groups. The process lasts until M reaches $M=2k^{I-1}$. Hence, the values $P_1, P_2 \ldots P_I$ are the availability P of the data file $F_0$ for M respectively:

$P=P_1$ for $M \leq k$; $P=P_I$ for $M=k^{I-1} \ldots 2k^{I-1}$.

For values of M between values $k^{I-1}$ and $2k^{I-1}$, every bucket already split and the new bucket created with the preferred embodiments now means the bucket participates in $f_I$ groups. The others still participate only in the groups up to $f_{I-1}$. Hence, for these values of M, one has P monotonously increasing with M from $P_{I-1}$ to $P_I$. For instance, for M=k+3, buckets 0,1,2,k,k+1,k+2 will already participate in $f_2$ groups, while all others will still participate in $f_1$ groups only. When M reaches M=2k buckets, the whole file has two availability and remains so until $M=k^2$ when the next level of availability, i.e., parity files, must be added.

Figure 5A:
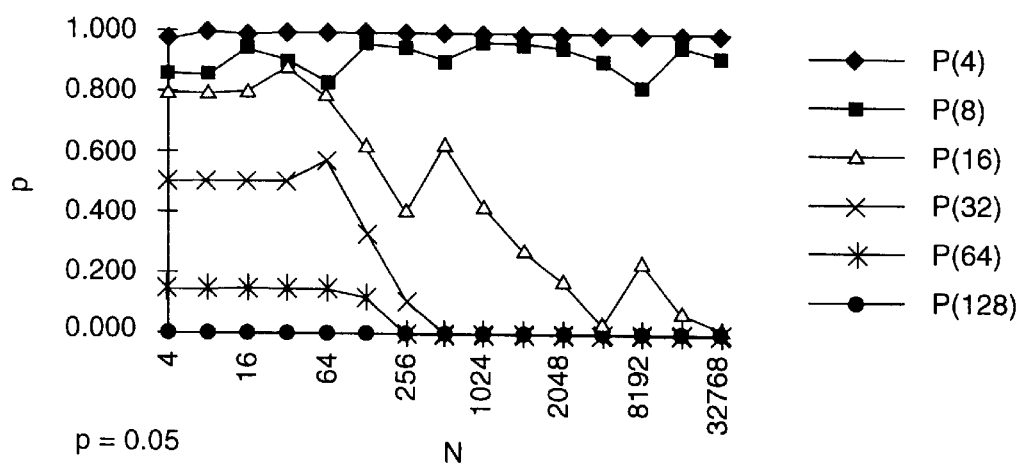
FIGS. 5a and 5b are charts showing the reliability P(k) of algorithms in accordance with preferred embodiments of the present invention for various values of p and k and for a file scaling up to M=32K buckets (sites)
Figure 5B:
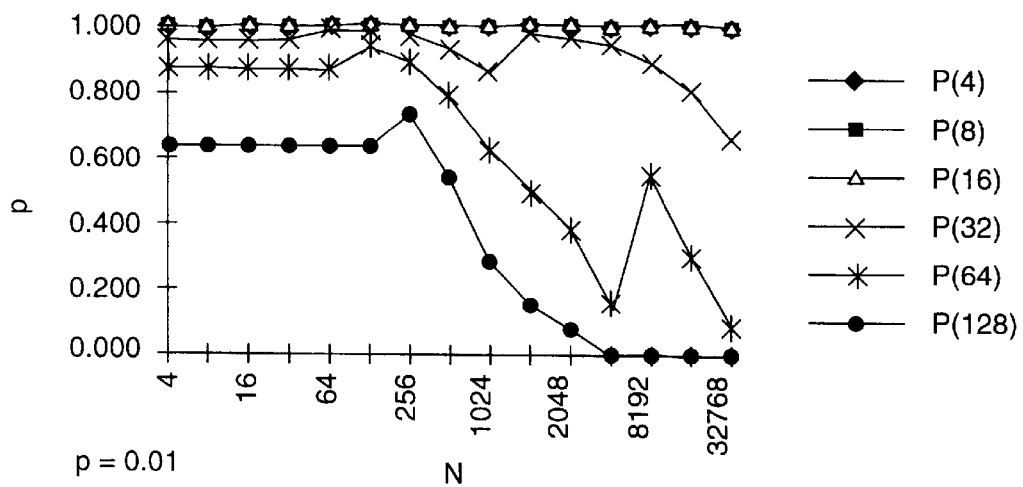

FIGS. 5a and 5b show several curves of P for higher availability values of p that are p=0.001 . . . 0.05. The values of k are shown between 4 and 128. A larger k is advantageous for access and storage performance. Choosing k=4 leads to the highest and flat P for all p's studied. P decreases for a larger k, but may still provide for a high-availability, especially for a smaller p. For instance, for p=0.001, even k=64 provides for P>0.995, for the largest file growth studied, i.e., up to M=32K buckets. For p=0.001, even k=128, provides the availability P>0.99 until the file reaches M=4K buckets. However, for a larger p, choosing k>4, typically leads to P that is always unacceptably low or decreases rapidly when the file scales up. Thus k should be chosen more carefully for p>0.001.

In the above embodiments, a new level grouping function is used, $f_{i+1}$, upon determining that the number of buckets scales upward to predetermined threshold, e.g., $k^2$, $k^3$, etc. However, in alternative embodiments, a new level grouping function, $f_{i+1}$, may be utilized upon determining that the availability has reached a predetermined threshold T, i.e., 95%. In this way, availability is increased when predetermined availability thresholds are reached.

In alternative embodiments, when the availability reaches a predetermined threshold T, e.g., less than some percentage value such as 95%, instead of going to a higher level grouping function $f_{i+1}$ to increase availability, the number k of data buckets in a bucket group may be reduced by some amount, such as half. Upon reducing k, fewer data buckets participate in a given parity bucket identified by a bucket group number. Thus, availability is improved because the failure of any parity bucket effects the reliability of fewer data buckets, and vice versa. Reducing k improves availability without having to provide an additional parity bucket, i.e., bucket group number, for each data bucket.

For instance, k may be halved until either P>T or k reaches some minimum value. Halving k doubles the number of bucket groups and parity records. However, reducing k does not increase the number of parity records associated with each data record. Thus, the insert and split does not cost as much as increasing availability with the orthogonal grouping functions described above. Alternatively, adding a parity bucket, e.g., going to a higher level grouping function using an orthogonal equation, increases the costs because another parity bucket must be added and an additional parity record for each data object must be provided.

In yet further embodiments, a combination of reducing k and using the orthogonal grouping functions to generate bucket group numbers may be utilized to improve availability. For instance, when availability falls below a predetermined threshold for a first time, k may be reduced to place fewer data records R(c) in any given parity bucket group. Subsequently, when availability again falls below a predetermined threshold, the grouping functions $f_i$ may be used to generate another set of bucket group numbers $g_i$ to provide that each data record R(c) now participates in at least i bucket groups. Any combination of these two algorithms may be used to increase availability after availability falls below the predetermined threshold T.

Generating Parity Records With Grouping Functions

Figure 6A:
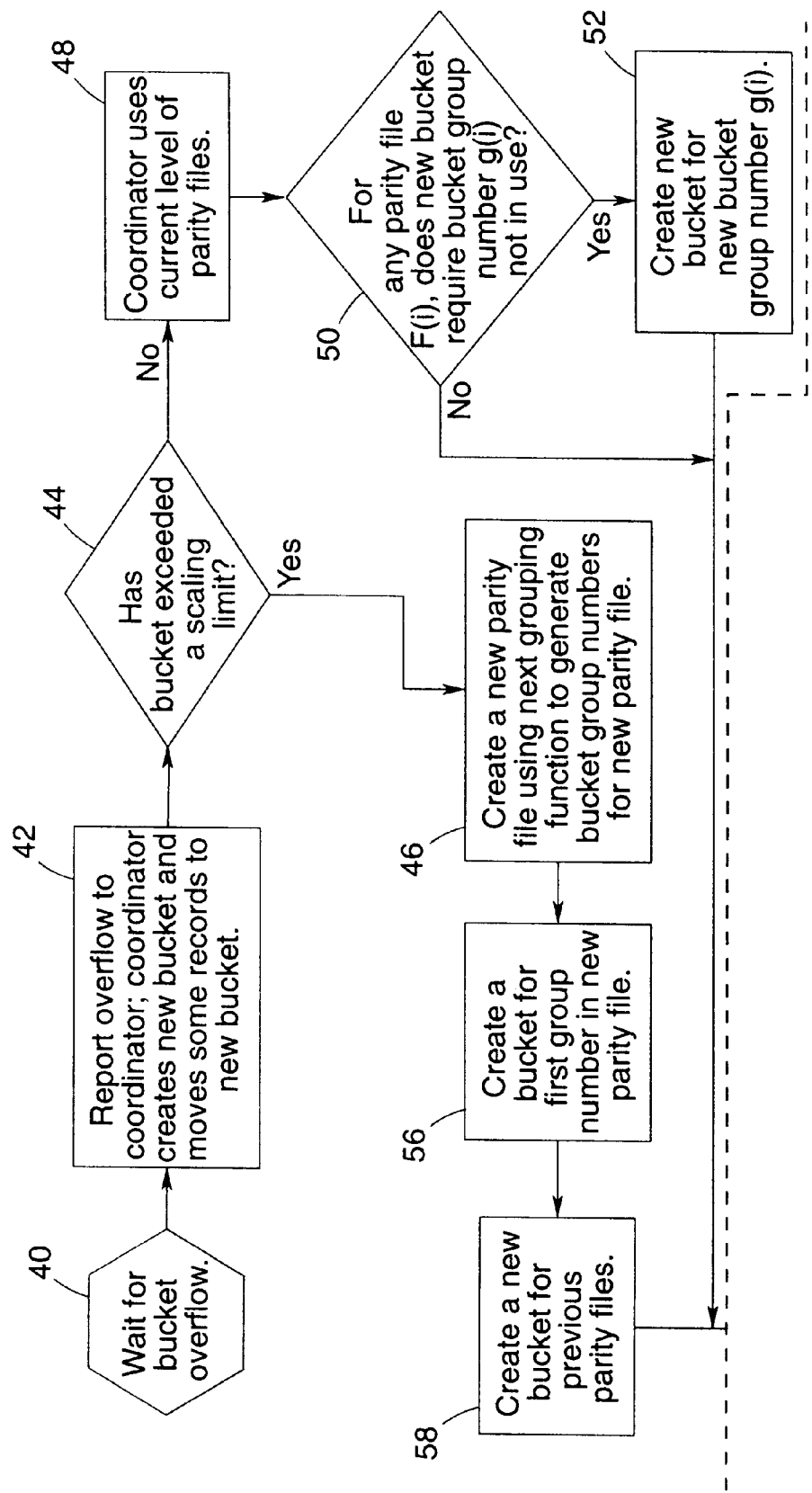
FIG. 6 is a flowchart illustrating preferred logic for storing parity data for data objects in a data file distributed throughout data buckets in accordance with preferred embodiments of the present invention.
Figure 6B:
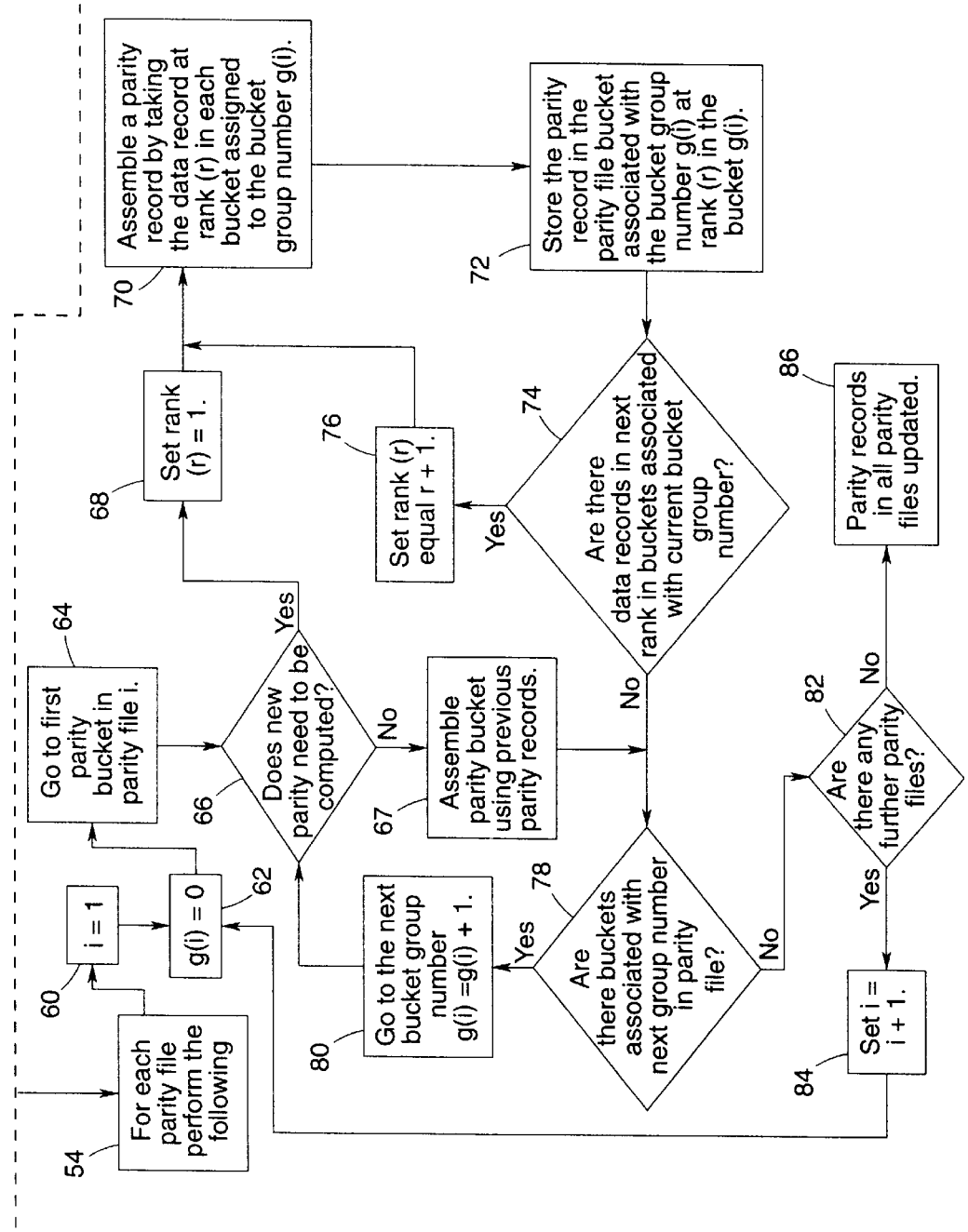

FIG. 6 illustrates logic implemented in hardware or software logic implemented in the coordinator 8 or any other server 4a, b, c, d in the network system 2 for assigning bucket group numbers $g_i$ to data buckets in the data file $F_0$; each bucket group number $g_i$ assigned to the data bucket indicates the bucket number in parity file $F_i$ that contains parity data for such data bucket. Those skilled in the art will recognize that this logic is provided for illustrative purposes only and that different logic may be used to accomplish the same results.

The logic of FIG. 6 begins at block 40 when an overflow occurs, e.g., a client 10a, b or other device attempts to add a record R(c) to one of the buckets, $B_0$–$B_{M-1}$, in memory 6a, b, c, d that exceeds the maximum number of records per bucket b. At block 40, the coordinator 8 may already be using N number of parity files $F_1$ to $F_N$ and generating bucket group numbers $g_1$ through $g_N$ using grouping functions $f_1$ through $f_N$. In such case, control proceeds to block 42 which represents the server 4a, b, c, d reporting the overflow to the coordinator 8 via the network 12. The coordinator 8 then causes a split of one of the buckets $B_0$–$B_{M-1}$, creating bucket $B_M$. The coordinator 8 then transfers records from the overflowed bucket to the new bucket $B_M$, along with the new record. LH* Methods for splitting buckets upon the occurrence of an overflow are described in "LH*—A Scalable, Distributed Data Structure," by Witold Litwin et al, which reference was incorporated by reference above.

Control then transfers to block 44 which represents the coordinator 8 determining whether the addition of new bucket $B_M$ reaches a scaling limit which indicates that the next grouping function $f_{n+1}$ function should be used to add another level of availability For instance, in preferred embodiments, when the number of buckets scales up to $k^l$ for a given l, the next grouping function is applied to generate an additional set of bucket group numbers $g_{N+1}$. If the new bucket scales $B_M$ up to the point where an additional grouping function $f_{N+1}$ is required, control transfers to block 46; otherwise, control transfers to block 48. In alternative embodiments, other methods could be used to determine whether an additional grouping function $f_{N+1}$ is required, such as determining whether availability (reliability) has fallen below a predetermined threshold T.

Block 48 represents the state where the coordinator 8 uses the current level of parity files $F_i$, for i=1 . . . N, to provide a parity record for the added data record that caused an overflow. From block 48, control transfers to block 50, which is a decision block representing the coordinator 8, considering the current grouping functions $f_i$, for i=1 . . . N, determining whether the addition of the new bucket $B_M$ requires the use of a bucket group number $g_i$ not currently in use in any of the parity files $F_i$. If so, control transfers to block 52; otherwise control transfers to block 54. Block 52 represents the coordinator 8 creating an additional bucket in the parity files $F_i$ for the new bucket group number $g_i$ needed for the added data record. This additional bucket will now store parity information for those data buckets in $F_0$ that are assigned this new bucket group number $g_i$. From block 52 control transfers to block 54, where the process of updating the parity records begins. If a new bucket group number $g_i$ was not needed to accommodate records from the new bucket $B_M$, then control proceeds to block 54.

If, at block 44, the coordinator 8 determined that the addition of the new bucket $B_M$ exceeded a scaling limit, thereby requiring the use of an additional grouping function $f_{n+1}$, then control proceeds to block 46. As discussed, an alternative criteria could be used to determine whether to scale-up to the next grouping function $f_{N+1}$, e.g., scaling-up when the availability reaches a threshold minimum. At block 46, the coordinator 8 creates a new parity file $F_{N+1}$, and uses the next grouping function $f_{N+1}$ to assign the bucket group numbers $g_{N+1}$ to the data buckets. Control then proceeds to block 56 which represents the coordinator 8 creating a new parity bucket to accommodate parity records added to the first bucket, i.e., bucket 0, in the new parity file $F_{N+1}$. The coordinator 8 may create a bucket by designating the bucket space in a server 4a, b, c, d to be the next bucket. Control transfers to block 58 which represents the coordinator 8 creating a new bucket in each of the previous parity files $F_i$ for i=1 . . . N. The addition of the bucket triggering the use of the next grouping function $f_{N+1}$ requires each parity file $F_i$ for i=1 . . . N to add a new bucket group number $g_i$ for i=1 . . . N to accommodate the additional bucket $B_M$ which triggered the scaling upward to another level of availability.

After any data bucket splitting in the $F_0$ file or the addition of parity files $F_i$ or bucket group numbers $g_i$, control transfers to block 54 et seq. to update the parity records ($g_i$, r) maintained in the parity files $F_i$. Block 54 represents the beginning of a loop, wherein the coordinator 8 performs steps 60 through 80 for each parity file $F_i$, for i≧1. Control proceeds to block 60 which represents the coordinator 8 setting i=1 and then to block 62 to set $g_i$=0. Control proceeds to block 64 which represents the coordinator 8 going to the first parity bucket $g_i$=0 for a given parity file $F_i$. Control proceeds to block 66 which represents the coordinator 8 determining whether new parity needs to be computed for the parity bucket. If so, control transfers to block 68; otherwise, control transfers to block 67. For instance, the arrangement of records in data buckets prior to the split may not be effected by the split. In such case, the coordinator 8 may use the previously computed parity records for the parity bucket $g_i$. If parity does not need to be recomputed, then control transfers to block 67 which represents the coordinator 8 assembling the parity bucket gi using the previously computed parity records ($g_i$, r).

If, however, parity does need to be recomputed, then control transfers to block 68 which represents the coordinator 8 setting the rank r to one (r=1). Control transfers to block 70 which represents the coordinator 8 assembling a parity record ($g_i$, r) by gathering the key records c from each data record R(c) having rank r in all the data buckets assigned to the bucket group number $g_i$. The coordinator 8 assigns the gathered key records c to the parity record ($g_i$, r). The coordinator 8 further computes parity for the non-key portion of the records R(c) and places the parity data in the parity record ($g_i$, r). Control transfers to block 72 which represents the coordinator 8 inserting the assembled parity record ($g_i$, r) in the $g_i^{th}$ parity bucket in parity file $F_i$ at rank r in the parity bucket. For instance, if $g_i$=1, then coordinator 8 would store the parity record ($1_i$, r) in bucket 1 of parity file $F_i$ at rank r in the parity bucket 1.

After adding a parity record ($g_i$, r) to the parity bucket in parity file $F_i$, control transfers to block 74 which is a decision block representing the coordinator 8 determining whether there are data records in rank r=r+1 in any of the data buckets associated with the current bucket group number $g_i$. If so, control transfers to block 76; otherwise control transfers to block 78. At block 76, the coordinator 8 increments the current rank r by one and proceeds through steps 70 et seq. to add the next parity record ($g_i$, r+1) to the parity bucket $g_i$ in parity file $F_i$.

If the previous parity is used at block 67 and if there are no further records R(c) at the next rank r level in the data buckets assigned to the bucket group number $g_i$, at block 74, then control transfers to block 78 which represents the coordinator 8 determining whether any of the current data buckets in $F_0$ are associated with the next bucket group number $g_i$+1 for the current parity file $F_i$. If so, control transfers to block 80; otherwise, control transfers to block 82. If there are additional bucket group numbers $g_i$+1 assigned to data buckets, control transfers to block 80 which represents the coordinator 8 incrementing the bucket group number $g_i$ by one, i.e., $g_i$=$g_i$+1 and then proceeding to steps 66 et seq. to add all the parity records ($g_i$+1, r) associated with the next bucket group number $g_i$+1.

If there are no further parity buckets in parity file $F_i$, i.e., no more bucket group numbers $g_i$ that have not been considered, then control transfers to block 82 which represents the coordinator 8 determining whether there are further parity files $F_i$. If so, control proceeds to block 84 which represents the coordinator 8 incrementing i by one, i.e., i=i+1, to update all the parity records ($g_{i+1}$, r) for the next parity file $F_{i+1}$ at blocks 62 et seq. Otherwise, control transfers to block 84 as updating the arrangement of the parity records ($g_i$, r) has been completed.

The logic of FIG. 6 could also be used for file contraction when a data record R(c) is deleted. This operation would be the inverse of the file expansion operations occurring upon a bucket overflow. Deletion of records c could cause the merging of buckets, as described in "LH*—A Scalable, Distributed Data Structure," by Witold Litwin, et. al, which was incorporated by reference above. When buckets merge, fewer parity files $F_i$ are needed. When a data bucket in the data file $F_0$ merges, then a related parity bucket in one of the parity files $F_i$ may merge as fewer parity buckets would be needed.

The logic of FIG. 6 and preferred grouping functions $f_i$ conserve computational resources because the addition of a parity file $F_{i+1}$ to accommodate an added record R(c) does not alter the existing group numbers $g_i$ assigned to the current data buckets. Only a new group number $g_{i+1}$ is created, or an existing parity record is updated. Increasing the availability of files by adding a parity file $F_i$ does not require a global reorganization of the existing files.

The above logic and algorithms provide for scalable-availability, in that the availability, or ability to recover data upon failure, increases as the file size increases. An s-available file means that the file F remains available despite the unavailability of any s buckets. The unavailability of s+1 buckets compromises the availability of the file F. Alternatively, the availability may decrease as the file size F decreases. Scaling upward to create an additional parity file $F_{i+1}$ by using the next grouping function $f_{i+1}$ allows records $c_1$, $c_1'$ in the same record group ($g_1$,r) according to $f_1$, to become members of different groups ($g_2$,r) and ($g_2'$,r). There is no other record of $g_1$ in these groups. If $c_1$ and $c_1'$ both fail, they cannot be recovered using parity bits of $g_1$. However, $c_1$ can be possibly recovered using parity bits of $g_2$. Then, $c_1'$ can be recovered either from $g_1$ or $g_2'$. Adding $f_2$, allows thus for 2-availability.

Data Recovery

If a client 10a, b or server 4a, b, c, d attempts to access a bucket $B_m$ at a physical address and detects that the $B_m$ is unavailable, the client or server notifies the coordinator 8. Further, the server 4a, b, c, d including the failed bucket $B_{0,1,2,M-1}$ can detect the failure and notify the coordinator 8 of such failure. The failed bucket $B_m$ may be a data bucket and/or a parity bucket. The coordinator 8 begins recovery by creating a spare bucket $B_S$ at a spare server (S) in the network 12. The address of the spare server (S) becomes the address for $B_m$. If the unavailability occurs during a key search, the coordinator 8 may just recover the requested key. The coordinator 8 sends an IAM message to the servers 4a, b, c, d and clients 10a, b to provide notification of the change of address for bucket $B_m$.

Figure 7A:
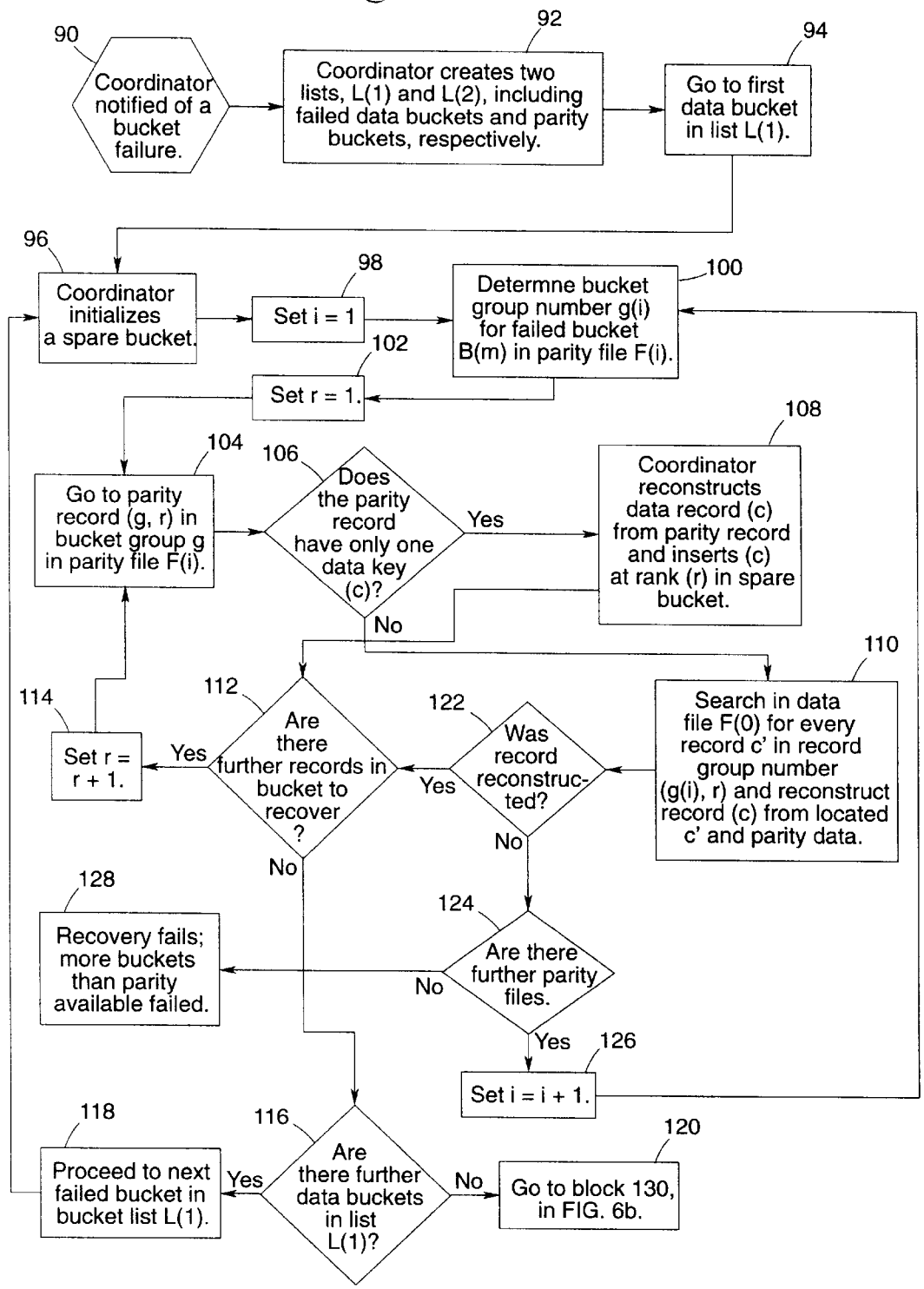

FIGS. 7a and 7b illustrate logic implemented in hardware and software executed in the coordinator 8 and other computers 4a, b, c, d, and 10a, b in the network 12 to recover failed data and/or parity buckets. Control begins at block 90 which represents the coordinator 8 being notified of a bucket failure from a server 4a, b, c, d or client 10a, b. Alternatively, the coordinator 8 may diagnose the failure of a bucket. Control proceeds to block 92 which represents the coordinator 8 constructing two lists $L_1$ and $L_2$, listing any failed data and/or parity buckets, respectively. Control then transfers to block 94 which represents the coordinator 8 going to the first data bucket in the list $L_1$. Control transfers to block 96 which represents the coordinator 8 initializing a spare bucket to recover the records in the failed bucket. Control transfers to block 98 which represents the coordinator 8 setting i=1 to examine the first parity file $F_1$. Control transfers to block 100 which represents the coordinator 8 determining the bucket group number $g_1$ for the failed bucket.

Control then proceeds to block 102 et seq. to recover data using the parity records ($g_i$, r). At block 102, the coordinator sets r to one to recreate data using parity record ($g_1$, 1). Control transfers to block 104 which represents the coordinator 8 going to parity record ($g_i$, r) in parity file $F_i$; which in the case of the first loop is parity record ($g_1$, 1) in the first parity file $F_1$. Control proceeds to block 106 which represents the coordinator 8 determining whether the parity record ($g_i$, r) has only one data key c. If there is only one data key c in the parity record, then control proceeds to block 108; otherwise block 110. If there is only one data record in the parity record ($g_i$, r), then that record must be for the failed bucket. In such case, at block 108, the coordinator 8 recovers the data record R(c) from the parity bits and the key c in the parity record ($g_i$, r) and inserts the record R(c) at rank r in the spare bucket. The parity bits and key c in the parity records allows recovery of the non-key data for the record R(c). From block 108, control proceeds to block 112 et seq. to recover the next record at the next rank r in the failed data bucket. At block 112, the coordinator 8 determines whether there are further data records R(c) to be recovered, i.e., whether the last rank r was recovered. If so, control transfers to block 114; otherwise, control transfers to block 116. If there are further records R(c)at a higher rank r, control proceeds to block 114 to increment r to recover the next record R(c) at the next rank value r+1 by looping back through steps 104 et seq.

If there are no further records of higher rank r to reconstruct, then at block 116, the coordinator 8 determines whether there are any further failed data buckets in the data bucket list $L_1$. If there are further failed buckets in the data bucket list $L_1$, control transfers to block 118 to proceed to the next failed bucket in the bucket list $L_1$ and return to block 96 to recover the data records R(c) for the next failed data bucket. If, at block 116, the coordinator 8 determines that there are no further data buckets in the list $L_1$ to recover, control transfers to block 120 to proceed to recover any failed parity buckets. Once an entire failed data bucket has been recovered in the spare bucket, the coordinator 8 sends an IAM message to all systems attached to the network 12 to update their physical allocation tables to change the address of the failed bucket to the address of the spare bucket including the reconstructed records.

If, at block 106, the coordinator 8 determined that the parity record ($g_i$, r) has more than one data record c, control proceeds to block 110 which represents the coordinator 8 searching in data file $F_0$ for every key c' in data buckets assigned to the same record group number ($g_i$, r) to which the failed bucket was assigned that is different from the record c to be constructed. The coordinator 8 then reconstructs record c from the located records c' in the non-failed data buckets assigned to the bucket group number $g_i$ and parity data in parity record ($g_i$, r). From block 110, control transfers to block 122 which represents the coordinator 8 determining whether the record c was successfully recovered. If so, control proceeds to block 112 et seq. to recover any further records in the spare bucket, if available; otherwise, control proceeds to block 124.

If the coordinator 8 failed to recover the failed record from the current parity file $F_i$, then at block 124, the coordinator 8 determines if there are any further parity files $F_{i+1}$ to again attempt to reconstruct the record c. If so, control transfers to block 126; otherwise, control transfers to block 128. At block 126, the coordinator increments i by one to proceed to the next parity file $F_{i+1}$ and back to block 100 et seq. to attempt to reconstruct the record c from the buckets in the next parity file $F_{i+1}$. In the above logic, the coordinator 8 proceeds sequentially through parity files $F_i$ to recover the failed data by incrementing i at block 126. However, in alternative embodiments, the coordinator 8 could select parity files $F_i$ out of sequence, i.e., in some random or non-sequential order, when attempting to reconstruct the failed record R(c). In such case, after a parity file $F_i$ is examined and the data record c was not successfully recovered, such considered parity file $F_i$ is not considered again in the recovery of the particular record c. If there are no further parity files and the attempt at recovering the record c failed, control transfers to block 128 which represents the bucket recovery failing. Bucket recovery fails if the number of failed buckets exceeds the availability of parity and data buckets.

The logic of FIG. 7a can be used to recover a key c requested in a key search. If the requested key c is unavailable, then the coordinator 8 can reconstruct key c using the logic of FIG. 7a and then provide that reconstructed key c to the requesting device. In certain embodiments, the coordinator 8 may not restore in the file $F_i$ the record R(c) for the recovered key c or any other records R(c) in the failed bucket. Thus, the requested record is recovered only for purposes of the search request.

If all the data buckets in the bucket list $L_1$ have been successfully recovered, control transfers to block 130 in FIG. 7b to reconstruct any failed parity buckets. Block 130 represents the coordinator 8 going to the list $L_2$ containing the failed parity buckets. Control proceeds to block 132 which represents the coordinator 8 going to the first failed parity bucket. Control transfers to block 134 which represents the coordinator 8 determining the parity file $F_i$ and bucket group number $g_i$ for the failed parity bucket. The coordinator 8 could perform such calculation using the grouping functions. Control then transfers to block 136 which represents the coordinator 8 initializing a spare bucket in which to recover the parity records ($g_i$, r) for the failed parity bucket. Control transfers to block 138 which represents the coordinator 8 setting r, the rank insertion counter, to one. Control then proceeds to block 140 which represents the coordinator 8 querying all data buckets having the bucket group number $g_i$. The coordinator 8 locates the data records R(c) having rank r in the data buckets associated with the bucket group number $g_i$ of the failed parity bucket.

Control transfers to block 142 which represents the coordinator 8 requesting record R(c) having rank r in each data bucket associated with bucket group number is $g_i$. Control transfers to block 144 which represents the coordinator 8 reconstructing parity record ($g_i$, r) from the requested records R(c). Control then transfers to block 146 which is a decision block representing the coordinator 8 determining whether recovery of the parity record ($g_i$, r) was successful. If so, control transfers to block 148; otherwise, control transfers to block 150. If the parity record ($g_i$, r) was successfully recovered, then at block 148, the coordinator 8 determines whether there are any additional parity records ($g_i$, r) in the failed parity bucket, i.e., further insert counter values r. If so, control transfers to block 152 to increment the rank r by one; otherwise, control transfers to block 154. From block 152 control proceeds back to block 140 et seq. to recover the subsequent parity record ($g_i$, r+1) in the failed parity bucket associated with bucket group number $g_i$.

If, there are no further parity records ($g_i$, r) at block 148, then the recovery of the parity bucket was successful, and control transfers to block 154 which represents the coordinator 8 determining whether there are any further failed parity buckets in the bucket list $L_2$. If so, control transfers to block 156; otherwise, control transfers to block 158. Block 156 represents the coordinator going to the next failed parity bucket $g_i$ in list $L_2$. From block 156, control transfers back to block 134 to recover the next failed parity bucket in the list $L_2$. If there are no further failed parity buckets in the list $L_2$, then at block 158 all failed parity and/or data buckets have been successfully recovered.

If at block 146 the recovery of the failed parity record was unsuccessful, then the coordinator 8 would have had to detect an unavailable data bucket at block 150. If a parity record or bucket cannot be recovered, then one of the data buckets associated with the failed parity bucket must be unavailable; otherwise, the failed parity bucket would be successfully reconstructed. Control transfers to block 160 which represents the coordinator 8 adding the failed data bucket(s) to the failed data bucket list $L_1$. Control then transfers to block 162 which represents the coordinator 8 returning to block 94 in FIG. 6a to recover the failed data buckets added to the bucket list $L_1$.

In the above algorithm, if the availability is I, i.e., there are I parity files, $F_1$ through $F_I$, then the algorithm of FIGS. 7a, b almost always terminates successfully. If there are more than I unavailable buckets, then the data recovery operation may fail.

A variation of the above algorithms can be used to recover a single record. For instance, if a client 10a, b initiates a key search and finds that the bucket containing the key c is unavailable, then the client 10a, b would notify the coordinator 8. The coordinator would compute the bucket group number $g_i$ of the failed bucket and send a query to the parity bucket g in parity file $F_i$ requesting the parity record ($g_i$, r) containing c. The coordinator 8 would start at the first parity file, i.e., i=1. If c is the only record in parity record ($g_i$, r), then record c is reconstructed from the parity bits in parity record ($g_i$, r). If there are multiple records c in the parity record ($g_i$, r), then the coordinator 8 searches for all records c' not c in the data buckets in $F_0$, using the hashing function to locate the bucket. If all records c' are located, then the coordinator 8 reconstructs c using all the other records c' and the parity bits.

Initially for data record recovery, the coordinator 8 searches in parity files $F_0$, $F_1$. If the above record recovery steps are unsuccessful for $F_0$, $F_1$ and there are further parity files $F_2$ etc. then the next parity file $F_2$ is examined up until the Ith parity file $F_I$. If there are less than I unavailable buckets, then the coordinator should recover the data record c from one of the existing parity files $F_i$. If more than I buckets are unavailable, then the record recovery effort will fail.

Conclusion

This concludes the description of the preferred embodiments of the invention.

The following describes some alternative embodiments for accomplishing the present invention.

Preferred embodiments utilize a specific grouping functions. However, in alternative embodiments alternative orthogonal equations that satisfy the Bucket Grouping Proposition could be used. In yet further embodiments, any equation that satisfies the Bucket Grouping Proposition mentioned above could be used.

In preferred embodiments, certain operations are described as being performed by the coordinator 8. However, those skilled in the art will appreciate that other components in the network 12 may be used to carry out some of the grouping and data recovery operations described above as being executed by the coordinator 8.

In summary, preferred embodiments disclose a system for generating parity information for a data file. Data objects in the data file are distributed into data buckets located in memory areas in servers interconnected by a network. An nth set of bucket group numbers are generated. A data bucket and a parity bucket are associated with a bucket group number in the nth set. Parity data for the data objects is generated and stored in a parity bucket associated with a bucket group number in the nth set. After adding a data object to the data file an additional data bucket may be provided for additional data object storage space. After adding a data bucket, a determination is made as to whether bucket availability has decreased below a predetermined threshold. If so, an (n+1)th set of bucket group numbers is generated and parity data for at least one of the data objects is stored in a parity bucket associated with a bucket group number in the (n+1)th set. A bucket group number in the (n+1)th set is associated with a data bucket and a parity bucket.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating parity information for a data file, wherein data objects in the data file are distributed into data buckets located in storage areas in servers interconnected by a network, comprising the steps of:

generating an nth set of bucket group numbers, wherein n is an integer value greater than zero, and wherein a data bucket and a parity bucket are associated with a bucket group number in the nth set;

generating parity data for the data objects;

storing the parity data in a parity bucket associated with a bucket group number in the nth set;

adding a data object to the data file;

initiating an additional data bucket to provide additional data object storage space;

determining whether bucket availability has decreased below a predetermined threshold in response to initiating the additional data bucket;

generating an (n+1)th set of bucket group numbers after determining that the initiation of the additional data bucket has caused availability to fall below the predetermined threshold, wherein a data bucket and parity bucket are associated with a bucket group number in the (n+1)th set; and storing parity data for at least one of the data objects in a parity bucket associated with a bucket group number in the (n+1)th set.

2. The method of claim 1, wherein prior to generating the (n+1)th set of bucket group numbers, parity data for data objects in k data buckets are maintained in a parity bucket associated with a bucket group number in the nth set, wherein the step of generating the (n+1)th set of bucket group numbers comprises the steps of:

reducing k to a lower value k';

associating k' data buckets with a bucket group number in the nth set of bucket group numbers, wherein parity data for the k' data buckets is stored in the bucket group number in the nth set; and generating the (n+1)th set of bucket group numbers, wherein k–k' data buckets not associated with a bucket group number in the nth set are associated with a bucket group number in the (n+1)th set, wherein parity data for the k–k' data buckets not stored in a parity bucket associated with a bucket group number in the nth set is stored in a parity bucket associated with a bucket group number in the (n+1)th set.

3. The method of claim 2, further including the steps of:

determining whether bucket availability has decreased below a predetermined threshold for a second time;

generating an (n+2)th set of bucket group numbers after determining that bucket availability has decreased below a predetermined threshold for a second time;

generating second parity data for the data objects; and storing the second parity data in a parity bucket associated with a bucket group number in the (n+2)th set.

4. The method of claim 1, wherein the parity data generated and stored in parity buckets associated with bucket group numbers in the nth set comprises first parity data, wherein the step of generating the (n+1)th set of bucket group numbers further comprises the step of generating second parity data for the data objects, wherein the step of storing the parity data in a parity bucket associated with a bucket group number in the (n+1)th set comprises storing the the second parity data in at least one parity bucket associated with a bucket group number in the (n+1)th set.

5. The method of claim 4, wherein the step of determining whether bucket availability has decreased below a predetermined threshold comprises determining whether the use of an additional data bucket has exceeded a predetermined bucket limit.

6. The method of claim 4, wherein data buckets are assigned bucket group numbers in the nth and (n+1)th sets of bucket group numbers such that for a first data bucket and a second data bucket, if the first data bucket and second data bucket are associated with the same bucket group number in the nth set of bucket group numbers, then the first data bucket and second data bucket are associated with different bucket group numbers in the (n+1)th set of bucket group numbers.

7. The method of claim 4, wherein each data bucket includes at least one data object, wherein each bucket group number is associated with a plurality of data buckets and one parity bucket such that each bucket group number associates a plurality of data buckets with one parity bucket, further comprising the step of:

generating first parity data for the data objects in the data buckets associated with the same bucket group number in the nth set of bucket group numbers;

storing the generated first parity data in the parity bucket associated with a bucket group number in the nth set;

generating second parity data for the data objects in each data bucket associated with the same bucket group number in the (n+1)th set of bucket group numbers; and storing the generated second parity data in the parity bucket associated with a bucket group number in the (n+1)th set.

8. The method of claim 4, wherein each data object in a data bucket is assigned a rank value, further comprising the steps of:

for a given rank value and a given bucket group number in the nth set of bucket group numbers, generating a first parity record to include parity data for every data object having the given rank value in the data buckets associated with the given bucket group number in the nth set;

storing the first parity record in a parity bucket associated with the given bucket group number in the nth set;

for a given rank value and a given bucket group number in the (n+1)th set of bucket group numbers, generating a second parity record to include parity data for every data object having the given rank value in the data buckets associated with the given bucket group number in the (n+1)th set; and storing the second parity record in a parity bucket associated with the given bucket group number in the (n+1)th set.

9. The method of claim 8, wherein data objects are comprised of key data and non-key data, wherein the step of generating a parity record for a given rank value and bucket group number further includes the steps of:

including in the parity record the key data of the data objects whose parity data is maintained in the parity record; and including in the parity record parity bits used to recover the non-key data of the data objects whose parity data is maintained in the parity record.

10. A computer system for generating parity information for a data file comprised of data objects, comprising:

a plurality of computer devices including storage locations;

a network providing communication among the computer systems;

a plurality of data buckets included within storage locations of the computer devices, wherein the data objects are stored in data buckets throughout the network;

means for generating an nth set of bucket group numbers, wherein n is an integer value greater than zero, wherein a data bucket and a parity bucket are associated with a bucket group number in the nth set;

means for generating parity data for the data objects;

means for storing the parity data in a parity bucket associated with a bucket group number in the nth set;

means for adding a data object to the data file;

means for initiating an additional data bucket to provide additional data object storage space;

means for determining whether bucket availability has decreased below a predetermined threshold;

means generating a second set of bucket group numbers after determining that the initiation of the additional data bucket has caused availability to fall below the predetermined threshold, wherein a data bucket and parity bucket are associated with a bucket group number in the (n+1)th set; and means for storing parity data for at least one of the data objects in a parity bucket associated with a bucket group number in the (n+1)th set.

11. The computer system of claim 10, wherein the storage location is included in a storage device that is a member of the set of storage devices comprising a non-volatile storage device and a volatile storage device.

12. The computer system of claim 10, wherein prior to generating the (n+1)th set of bucket group numbers, parity data for data objects in k data buckets are maintained in a parity bucket associated with a bucket group number in the nth set, wherein the means for generating the (n+1)th set of bucket group numbers comprises:

means for reducing k to a lower value k';

means for associating k' data buckets with a bucket group number in the nth set of bucket group numbers, wherein parity data for the k' data buckets is stored in the bucket group number in the nth set; and means for generating the (n+1)th set of bucket group numbers such that k−k' data buckets not associated with a bucket group number in the nth set are associated with a bucket group number in the (n+1)th set, and parity data for the k−k' data buckets not stored in a parity bucket associated with a bucket group number in the nth set is stored in a parity bucket associated with a bucket group number in the (n+1)th set.

13. The computer system of claim 12, further including:

means for determining whether bucket availability has decreased below a predetermined threshold for a second time;

means for generating an (n+2)th set of bucket group numbers after determining that bucket availability has decreased below a predetermined threshold for a second time;

means for generating second parity data for the data objects; and means for storing the second parity data in a parity bucket associated with a bucket group number in the (n+2)th set.

14. The computer system of claim 10, wherein the parity data generated and stored in parity buckets associated with bucket group numbers in the nth set comprises first parity data, wherein the means for generating the (n+1)th set of bucket group numbers further generates second parity data for the data objects, wherein the means for storing the parity data in a parity bucket associated with a bucket group number in the (n+1)th set stores the second parity data in at least one parity bucket associated with a bucket group number in the (n+1)th set.

15. The computer system of claim 14, wherein each data bucket includes at least one data object, wherein each bucket group number is associated with a plurality of data buckets and one parity bucket such that each bucket group number associates a plurality of data buckets with one parity bucket, further comprising:

means for generating first parity data for the data objects in the data buckets associated with the same bucket group number in the nth set of bucket group numbers;

means for storing the generated first parity data in the parity bucket associated with a bucket group number in the nth set;

means for generating second parity data for the data objects in each data bucket associated with the same bucket group number in the (n+1)th set of bucket group numbers; and means for storing the generated second parity data in the parity bucket associated with a bucket group number in the (n+1)th set.

16. The computer system of claim 15, wherein each data object in a data bucket is assigned a rank value, further comprising:

means for generating a first parity record to include parity data for every data object having a given rank value in the data buckets associated with a given bucket group number in the nth set;

means for storing the first parity record in a parity bucket associated with the given bucket group number in the nth set;

means for generating a second parity record to include parity data for data objects having a given rank value in the data buckets associated with a given bucket group number in the (n+1)th set; and means for storing the second parity record in a parity bucket associated with the given bucket group number in the (n+1)th set.

17. The computer system of claim 16, wherein each data object comprises key data and non-key data, wherein the means for generating a parity record for a given rank value and given bucket group number further includes:

means for generating in the parity record the key data of each data object whose parity data is maintained in the parity record; and means for generating in the parity record parity bits used to recover the non-key data of the data objects whose parity data is maintained in the parity record.

18. An article of manufacture for use in programming a computer system comprised of a plurality of computer devices interconnected by a network system to generate parity information for a data file, wherein data objects in the data file are distributed into data buckets located in storage areas in the computer devices, the article of manufacture comprising at least one computer readable storage device including at least one computer program embedded therein that causes computer devices within the computer system to perform the steps of:

generating an nth set of bucket group numbers, wherein n is an integer value greater than zero, and wherein a data bucket and a parity bucket are associated with a bucket group number in the nth set;

generating parity data for the data objects;

storing the parity data in a parity bucket associated with a bucket group number in the nth set;

adding a data object to the data file;

initiating an additional data bucket to provide additional data object storage space;

determining whether bucket availability has decreased below a predetermined threshold in response to initiating the additional data bucket;

generating an (n+1)th set of bucket group numbers after determining that the initiation of the additional data bucket has caused availability to fall below the predetermined threshold, wherein a data bucket and parity bucket are associated with a bucket group number in the (n+1)th set; and storing parity data for at least one of the data objects in a parity bucket associated with a bucket group number in the (n+1)th set.

19. The article of manufacture of claim 18, wherein prior to generating the (n+1)th set of bucket group numbers, parity data for data objects in k data buckets are maintained in a parity bucket associated with a bucket group number in the nth set, wherein the step of generating the (n+1)th set of bucket group numbers comprises the steps of:

reducing k to a lower value k';

associating k' data buckets with a bucket group number in the nth set of bucket group numbers, wherein parity data for the k' data buckets is stored in the bucket group number in the nth set; and generating the (n+1)th set of bucket group numbers, wherein k–k' data buckets not associated with a bucket group number in the nth set are associated with a bucket group number in the (n+1)th set, wherein parity data for the k–k' data buckets not stored in a parity bucket associated with a bucket group number in the nth set is stored in a parity bucket associated with a bucket group number in the (n+1)th set.

20. The article of manufacture of claim 18, further including the steps of:

determining whether bucket availability has decreased below a predetermined threshold for a second time;

generating an (n+2)th set of bucket group numbers after determining that bucket availability has decreased below a predetermined threshold for a second time;

generating second parity data for the data objects; and storing the second parity data in a parity bucket associated with a bucket group number in the (n+2)th set.

21. The article of manufacture of claim 18, wherein the parity data generated and stored in parity buckets associated with bucket group numbers in the nth set comprises first parity data, wherein the step of generating the (n+1)th set of bucket group numbers further comprises the step of generating second parity data for the data objects, wherein the step of storing the parity data in a parity bucket associated with a bucket group number in the (n+1)th set comprises storing the second parity data in at least one parity bucket associated with a bucket group number in the (n+1)th set.

22. The article of manufacture of claim 21, wherein the step of determining whether bucket availability has decreased below a predetermined threshold comprises determining whether the use of an additional data bucket has exceeded a predetermined bucket limit.

23. The article of manufacture of claim 21, wherein data buckets are assigned bucket group numbers in the nth and (n+1)th sets of bucket group numbers such that for a first data bucket and a second data bucket, if the first data bucket and second data bucket are associated with the same bucket group number in the nth set of bucket group numbers, then the first data bucket and second data bucket are associated with different bucket group numbers in the (n+1)th set of bucket group numbers.

24. The article of manufacture of claim 21, wherein each data bucket includes at least one data object, wherein each bucket group number is associated with a plurality of data buckets and one parity bucket such that each bucket group number associates a plurality of data buckets with one parity bucket, further comprising the step of:

generating first parity data for the data objects in the data buckets associated with the same bucket group number in the nth set of bucket group numbers;

storing the generated first parity data in the parity bucket associated with a bucket group number in the nth set;

generating second parity data for the data objects in each data bucket associated with the same bucket group number in the (n+1)th set of bucket group numbers; and storing the generated second parity data in the parity bucket associated with a bucket group number in the (n+1)th set.

25. The article of manufacture of claim 21, wherein each data object in a data bucket is assigned a rank value, further comprising the steps of:

for a given rank value and a given bucket group number in the nth set of bucket group numbers, generating a first parity record to include parity data for every data object having the given rank value in the data buckets associated with the given bucket group number in the nth set;

storing the first parity record in a parity bucket associated with the given bucket group number in the nth set;

for a given rank value and a given bucket group number in the (n+1)th set of bucket group numbers, generating a second parity record to include parity data for every data object having the given rank value in the data buckets associated with the given bucket group number in the (n+1)th set; and storing the second parity record in a parity bucket associated with the given bucket group number in the (n+1)th set.

26. The article of manufacture of claim 25, wherein data objects are comprised of key data and non-key data, wherein the step of generating a parity record for a given rank value and bucket group number further includes the steps of:

including in the parity record the key data of the data objects whose parity data is maintained in the parity record; and including in the parity record parity bits used to recover the non-key data of the data objects whose parity data is maintained in the parity record.

27. A plurality of data and parity buckets located in storage areas in computer devices interconnected by a network for access by a computer device within the network, comprising:

a data file structure comprised of a plurality of data objects stored within data buckets throughout the computer system;

an nth parity file structure including parity data generated for the data objects in a data bucket, wherein n is an integer value greater than zero, wherein a bucket group number in an nth set of bucket group numbers is associated with a data bucket and a parity bucket, wherein a parity bucket associated with a bucket group number in the nth set that is also associated with the bucket from which the parity data was generated stores the parity data; and an (n+1)th parity file structure including parity data generated for the data objects in a data bucket, wherein a bucket group number in a (n+1)th set of bucket group numbers is associated with a data bucket and a parity bucket, wherein the (n+1)th parity file structure stores parity data after determining that bucket availability has decreased below a predetermined threshold.

28. The data and parity buckets of claim 27, wherein prior to generating the (n+1)th set of bucket group numbers, parity data for data objects in k data buckets are maintained in a parity bucket associated with a bucket group number in the nth set, wherein after generating the (n+1)th set of bucket group numbers, k' data buckets are associated with a bucket group number in the nth set of bucket group numbers, wherein k' is less than k, wherein parity data for the k' data buckets is stored in the bucket group number in the nth set, and wherein k-k' data buckets not associated with a bucket group number in the nth set are associated with a bucket group number in the (n+1)th set, wherein parity data for the k-k' data buckets not stored in a parity bucket associated with a bucket group number in the nth set is stored in a parity bucket associated with a bucket group number in the (n+1)th set.

29. The data and parity buckets of claim 27, wherein the parity data generated and stored in parity buckets associated with bucket group numbers in the nth set comprises first parity data, wherein the parity data stored in parity buckets associated with the (n+1)th set of bucket group numbers comprises second parity data generated after determining that bucket availability has decreased below a predetermined threshold.

30. The data and parity buckets of claim 29, wherein data buckets are assigned bucket group numbers in the nth and (n+1)th sets of bucket group numbers such that for a first data bucket and a second data bucket, if the first data bucket and second data bucket are associated with the same bucket group number in the nth set of bucket group numbers, then the first data bucket and second data bucket are associated with different bucket group numbers in the (n+1)th set of bucket group numbers.

31. The data and parity buckets of claim 29, wherein data objects in a data bucket are assigned a rank value, further comprising:

parity records, wherein for a given rank value and bucket group number, each parity record includes parity data for every data object having the given rank value in the data buckets associated with the given bucket group number, wherein the parity records are stored in the parity bucket associated with the given bucket group number.

* * * * *